Dec. 17, 1957     F. J. KLANCNIK, JR     2,816,338
WIRE TYPE HOSE CLAMP
Filed Aug. 6, 1954
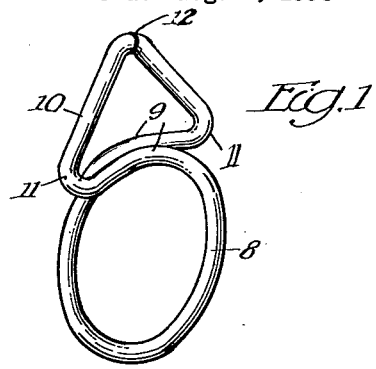
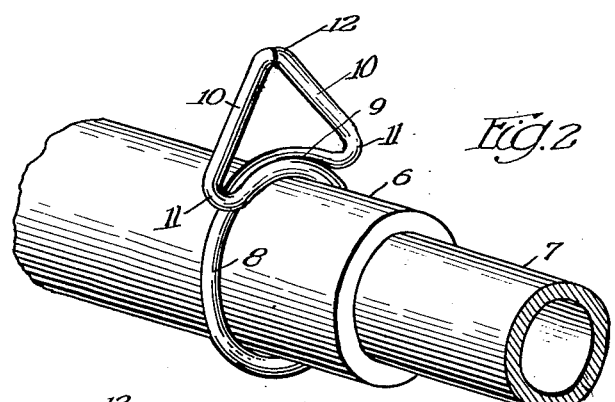
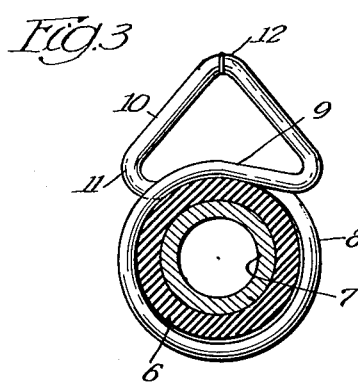
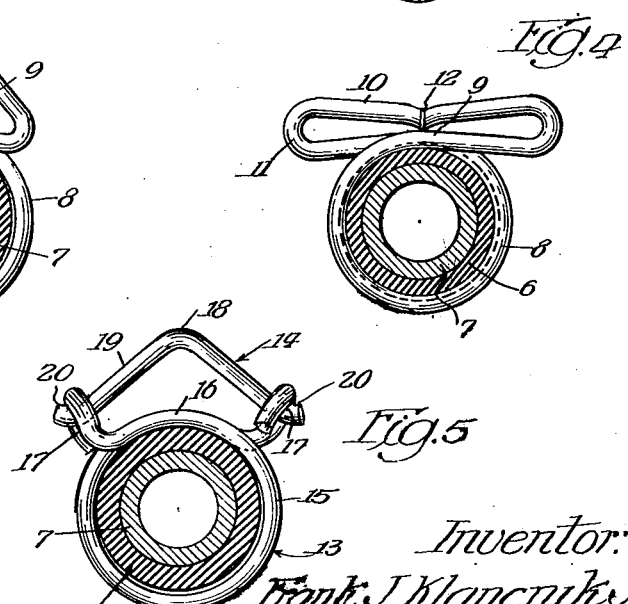
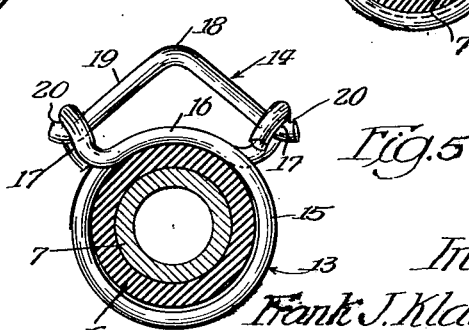
Inventor:
Frank J. Klancnik, Jr.
By: Fred Gerlach
atty.

United States Patent Office 2,816,338
Patented Dec. 17, 1957

2,816,338

WIRE TYPE HOSE CLAMP

Frank J. Klancnik, Jr., Chicago, Ill.

Application August 6, 1954, Serial No. 448,242

3 Claims. (Cl. 24—27)

The present invention relates generally to clamps. More particularly, the invention relates to that type of clamp which is designed primarily to clamp one end of a hose around one end of a conduit, is formed of a length of wire, has its central portion bent to form a loop for encircling the one end of the hose, has its end portions arranged in side-by-side relation and extending in opposite directions, and is provided with means whereby its end portions may be forced away from one another in order to contract the loop and thus cause it to clamp the one end of the hose around the one end of the conduit.

One object of the invention is to provide a hose clamp of the aforementioned type which is an improvement upon, and has certain inherent advantages over, previously designed clamps and is characterized by low cost of manufacture and ease or facility of application.

Another object of the invention is to provide a hose clamp of the type and character under consideration in which the means for forcing away from one another the end portions of the loop-forming length of wire is in the form of a V-shaped piece of wire which consists of a bent intermediate part and a pair of straight angularly disposed side parts, lies in the same plane as the loop, is arranged so that its bent intermediate part is disposed midway between, but outwards of, the end portions of the loop-forming length of wire and the side parts thereof extend towards said end portions, has the outer ends of its side parts connected, respectively, to the extremities of the end portions of the loop-forming length of wire, is adapted when the bent intermediate part is pressed inwards towards the loop to have the side parts thereof spread apart and thereby force the end portions of the loop-forming length of wire away from one another for loop contracting purposes, and has such physical characteristics or properties that the bent intermediate part after being pressed inwards towards the loop tends to remain in the position into which it is pressed until such time as it is intentionally pressed outwards for loop expanding purposes in connection with removal of the clamp from the hose to which it is applied.

A further object of the invention is to provide a hose clamp of the character last mentioned in which the outer ends of the side parts of the V-shaped piece of wire are formed integrally with, and are connected by half circle bends to, the extremities of the end portions of the loop-forming length of wire and have the inner ends thereof formed separately from one another but connected and welded together in such manner as to form the bent intermediate part of the V-shaped piece of wire.

A still further object of the invention is to provide a hose clamp which is generally of new and improved construction and effectively and efficiently fulfills its intended purpose.

Other objects of the invention and the various advantages and characteristics of the present hose clamp will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective view of a hose clamp embodying the preferred form of the invention;

Figure 2 is a perspective showing the hose clamp of Figure 1 after it has been applied to a hose around a conduit but before inward pressing of the bent intermediate part of the V-shaped piece of wire for loop contracting purposes;

Figure 3 is a view showing the hose and conduit in section and the clamp in elevation and before it has been manipulated into its hose clamping position by pressing or forcing inwards towards the loop the bent intermediate part of the V-shaped wire piece;

Figure 4 is a similar view except that it shows the clamp after the bent intermediate part of the V-shaped piece of wire has been pressed inwards for loop contracting purposes; and Figure 5 is a perspective of a hose clamp embodying a second or modified form of the invention.

The hose clamp which is shown in Figures 1 to 4, inclusive, of the drawing constitutes the preferred form of the invention. It is formed of a single length of wire and serves as a medium or instrumentality for clamping one end of a hose 6 around one end of a conduit 7. It is contemplated that the hose 6 will be formed of rubber, rubberized fabric or any other compressible material. The conduit 7 is illustrated in the drawing as being a pipe nipple although it is to be understood that it may be any other tubular element through which a fluid may flow. The clamp when in its operative position serves so to clamp or contract the one end of the hose around the one end of the conduit as to form a fluid tight joint or seal. The wire of which the clamp is formed is preferably, but not necessarily, circular in cross section. It is formed of any suitable metal and is of the type that is inherently resilient but will when sharply bent retain the bend.

The central portion of the length of wire of which the clamp of Figures 1 to 4, inclusive, is formed is bent circularly to form a loop 8. It is contemplated that normally the internal diameter of the loop 8 will be slightly greater than the external diameter of the hose 6. The portions of the length of wire that are between the central loop-forming portion of the wire and the extremities of the wires are to be considered as end portions and are designated in the drawing by the reference numeral 9. They are arranged in side-by-side relation and extend in opposite directions. As best shown in Figures 1 and 2, the end portions 9 are curved or arcuate and serve to complete the loop 8. The extremities of the length of wire of which the hose clamp is formed are designated in the drawing by the reference numeral 10 and are bent outwardly and inwardly so that they are outwardly convergent. They are substantially straight and have what may be termed their outer ends formed integrally with, and connected by substantially half circle bends 11 to, the adjacent or adjoining ends of the end portions 9. The other or inner ends of the extremities 10 are bent inwards and are welded together in such manner as to form a bent part 12 which normally extends throughout an arc of substantially 90°. The outwardly convergent extremities 10 and the bent part 12 collectively form a V-shaped piece of wire which consists of a bent intermediate part (bent part 12) and a pair of straight angularly disposed side parts (extremities 10), lies in the same plane as the loop 8, is arranged so that its bent intermediate part is disposed midway between, but outwards of, the end portions 9, has the outer ends of its side parts connected, respectively, to the extremities of the end portions 9, and forms means whereby in connection with inward forcing or pressing of the bent part 12 the end portions 9 are forced away from one another and result in contraction of the loop 8 for hose clamping purposes.

In connection with use of the clamp shown in Figures 1 to 4, inclusive, it is contemplated that the loop 8 will be slid into encircling relation with the hose 6 before the conduit 7 is inserted into the hose. After the conduit 7 is inserted into the hose, the clamp is manipulated so that the loop 8 surrounds the end of the hose that extends around the inserted end of the conduit. After the clamp is properly manipulated or positioned, the bent part 12 is pressed inwards towards the loop 8 by striking it with a hammer or any other suitable tool. In connection with inward pressing of the bent part 12, the extremities 10 constituting the side parts of the aforementioned V-shaped piece of wire are caused to spread outwards as shown in Figure 4. In connection with outward spreading of the extremities 10, the end portions 9 are forced away from one another and result in contraction of the loop 8. It is contemplated that the bent part 12 will be pressed or forced inwards to such an extent that the loop 8 will be contracted sufficiently to cause the hose to be firmly clamped around the conduit. Because of the character or physical properties of the wire of which the aforesaid V-shaped piece of wire is formed, the bent part 12 tends after being pressed inwards towards the loop 8 to remain in the position into which it is pressed. Because of this the loop 8 will remain in its contracted position wherein it serves as previously pointed out firmly to clamp the hose 6 around the conduit 7. When it is desired to release the clamp the bent part 9 is forced or pressed outwards. This results in the extremities 10 that constitute the side parts of the aforementioned V-shaped length of wire swinging or moving inwards. Such movement on the part of the extremities 10 operates to draw the end portions 9 towards one another thereby resulting in expansion of the loop 8.

The hose clamp of Figures 1 to 4, inclusive, is essentially simple in design and may be produced at an extremely low cost. Because of the particular construction or design, the clamp may be applied and removed with facility. By reason of the fact that the clamp includes the bent part 12, the loop 8 may, within certain limits, be contracted to any desired extent and will stay or remain in whatever position into which it is contracted.

The hose clamp which is shown in Figure 5 of the drawing is in effect a modification or another embodiment of the invention. It is of two-piece construction and consists of a length 13 of wire and a V-shaped piece 14 of wire. The wire of which the length 13 and the piece 14 are formed is of the type that is resilient but will when sharply bent retain the bend. The central portion of the wire length 13 is bent to form a loop 15 for encircling the hose to which the clamp is to be applied. The end portions of the wire length 13 are designated in the drawing by the reference numeral 16 and are arranged in side-by-side relation and so that they extend in opposite directions. The extremities of the end portions 16 are bent to form a pair of eyes 17. The latter extend outwards with respect to the loop 15, and due to the length of the end portions 16, are spaced an appreciable distance apart. The wire piece 14 functions similarly to, and serves the same purpose as, the V-shaped wire piece (extremities 10 and bent part 12) of the clamp of Figures 1 to 4, inclusive. It is disposed outwards of, and lies in the same plane as, the loop 15 and consists of a bent intermediate part 18 and a pair of straight angularly disposed side parts 19. The bent intermediate part 18 is disposed midway between, but outwards of, the eyes 17 at the extremities of the end portions 16 of the wire length 13 and extends throughout an arc of approximately 90°. The side parts 19 of the wire piece 14 extend towards the end portions 16 and have the outer ends thereof bent outwards so as to form connecting parts 20. The latter fit within, and are welded to, the eyes 17 and serve with the eyes as means for connecting the outer ends of the side parts 19 to the end portions 16 of the wire length 13. When it is desired to contract the loop 15 of the clamp of Figure 5, the bent intermediate part 18 of the wire piece 14 is pressed or forced inwards towards the loop. This results in the side parts 19 spreading outwards and forcing the end portions 16 away from one another. Movement of the end portions 16 away from one another causes the loop 15 to contract. If it is desired to release the clamp of Figure 5, the bent or intermediate part 18 is pressed or forced away from the loop 15. This results in the side parts 19 swinging or moving together and causing the end portions 16 to move toward one another. Such movement on the part of the end portions 16 results in expansion of the loop 15 of the wire piece 13.

The hose clamp that is shown in Figure 5 operates on the same principle and in the same manner as the clamp of Figures 1 to 4, inclusive. It effectively and efficiently fulfills its intended purpose and due to its particular construction may be manufactured readily and at a low cost.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a clamp adapted to extend around a hose and clamp the latter on a preformed conduit and comprising a length of wire having the central portion thereof bent to form a circular hose encircling loop the internal diameter of which is originally greater than the external diameter of the hose, and having its end portions arranged in side-by-side relation and extending in opposite directions, and a preformed, functionally single, V-shaped piece of wire consisting solely of a bent intermediate part and a pair of straight angularly disposed side parts, positioned so that the intermediate part is originally disposed outwards of the loop and the side parts extend in the direction of the end portions of the length of wire, having the outer ends of its side parts connected, respectively, to the extremities of said end portions, adapted when the bent intermediate part is pressed towards the loop after mounting of the loop around the hose to have the side parts thereof spread apart and cause said end portions to move away from one another and contract the loop into firmly clamped relation with the hose, also adapted when said intermediate part is pressed away from the loop to have its side parts move towards one another and cause said end portions to move towards one another and expand the loop so that it may be removed from the hose, and formed of wire of the type that is resilient but will when sharply bent retain the bend to the end that said bent intermediate part will tend to remain in either position into which it is pressed, said loop and V-shaped piece being formed of a single piece of wire.

2. As a new article of manufacture, a clamp adapted to extend around a hose and clamp the latter on a conduit and comprising a preformed length of wire having the central portion thereof bent to form a circular, hose encircling loop the internal diameter of which is originally greater than the external diameter of the hose, and having its end portions arranged in side-by-side relation and extending in opposite directions, and a preformed, functionally single, V-shaped piece of wire consisting solely of a bent intermediate part and a pair of straight angularly disposed side parts, positioned so that the intermediate part is disposed originally outwards of the loop and the side parts extend in the direction of the end portions of the length of wire, having the outer ends of its side parts connected by substantially half circle bends to the extremities of said end portions, adapted when the bent intermediate part is pressed towards the loop after mounting of the loop around the hose, to have the side parts thereof spread apart and cause said end portions to move away from one another and contract the loop into firmly clamped relation with the hose, also adapted when said intermediate part is pressed away from the loop to have its side parts move towards one another and cause said end portions to move towards one another and effect expansion of the loop so that is may be removed from the hose, and formed of wire of the type that is resilient but will when sharply bent retain the bend to the end that said bent intermediate part will tend to remain in either position into which it is pressed, said loop and V-shaped piece being formed of a single piece of wire.

3. As a new article of manufacture, a clamp adapted to extend around a hose and clamp the latter on a conduit and comprising a one-piece, preformed length of wire having the central portion thereof bent to form a single, circular hose encircling loop the internal diameter of which is greater than the external diameter of the hose, and having its end portions arranged in side-by-side relation and extending in opposite directions, and a preformed, V-shaped piece of wire consisting solely of an intermediate part bent originally on a 90° arc and a pair of straight angularly disposed side parts, positioned so that the intermediate part is originally disposed outwards of the loop and the side parts extend in the direction of the end portions of the length of wire, having the outer ends of its end parts formed integrally with, and connected by substantially half circle bends to, the extremities of said end portions, having the inner ends of its side parts formed separately from one another and also bent and welded together in such manner as to form said intermediate part, adapted when the bent intermediate part is pressed towards the loop after mounting of the loop around the hose to have the side parts thereof spread apart and cause said end portions to move away from one another and contract the loop into firmly clamped relation with the hose, also adapted when said intermediate part is pressed away from the loop to have its side parts move towards one another and cause said end portions to move towards one another and effect expansion of the loop so that it may be removed from the hose, and formed of wire of the type that is resilient but will when sharply bent retain the bend to the end that said bent intermediate part will tend to remain in either position into which it is pressed.

References Cited in the file of this patent

UNITED STATES PATENTS

| | | |
|---|---|---|
| 397,180 | Glauber | Feb. 5, 1889 |
| 2,194,318 | O'Neill et al. | Mar. 19, 1940 |